Oct. 9, 1962    G. CLEMENTE    3,057,069

METHOD OF FORMING A TOOTH CROWN

Filed Oct. 30, 1959

INVENTOR:-
GIUSEPPE CLEMENTE

United States Patent Office 3,057,069
Patented Oct. 9, 1962

3,057,069
METHOD OF FORMING A TOOTH CROWN
Giuseppe Clemente, Corso Rosselli 46, Turin, Italy
Filed Oct. 30, 1959, Ser. No. 849,801
Claims priority, application Italy Sept. 3, 1959
1 Claim. (Cl. 32—12)

Up to the present, artificial parts for teeth, particularly porcelain parts, were affixed to the crowns of artificial teeth, functioning as a support, by means of pegs or pins carried by the said crowns, and were also cemented; with such systems, however, the artificial dental parts often became detached during mastication, and particularly during the action of biting.

To obviate this drawback, the present invention provides for the application of the artificial dental parts in question to tooth-stumps to be crowned or to artifical teeth, by providing them with a metallic framework which is to be welded onto the metallic crown (in cases where a tooth is to be crowned) or to be welded onto an artificial tooth (in cases where a missing tooth is to be replaced). The artificial dental part can also be subjected to direct fusion. The said dental parts consist of a metallic framework which has various rough places and which is covered with porcelain with a low, medium or high melting-point.

The process for the application of the artifical dental part to a crown, for example, is as follows:

The model of the tooth-stump having been constructed by the already known systems, the artificial porcelain dental part, prefabricated with its metal framework, is fitted to it. The required metal covering is then modelled with suitable material (wax, resin, etc.) necessary for the production of the crown. When the dental part has been fitted to the stump and the modelling operation completed, the artificial dental part is detached, and the fusion-process, or the production of the remaining part, which was modelled in advance, is then carried out.

When the above-mentioned operations have been completed, as well as the cleaning and polishing, the zone to which the artificial dental part was fitted will be covered with finishing-metal in powder-form (metal used for welding) and also with an anti-oxidant material. When this has been done, the artificial dental part will be introduced into its seating, prepared in advance, and it will be held in the correct position by means of a spring, weight or other suitable means; the entire unit will then be brought to the melting-temperature of the finishing-metal, in order to effect the welding. The finishing will then be applied to the unit thus manufactured, and the work is terminated.

The attached drawing illustrates, by way of an example and without any limitative effect, a preferred means of carrying out the process to which the invention relates, and in this drawing.

Figure 1:
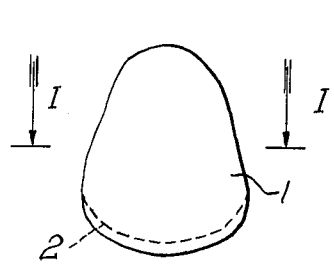
FIGS. 1 and 2 represent, respectively, a front view and a cross section along line I—I of the artificial dental part.
Figure 2:
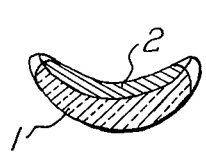

With reference to the drawing (FIGS. 1 and 2), 1 indicates the artificial porcelain dental part or face to the internal concave surface of which is welded by the known means a thin metal layer 2 constituting the framework. The metal framework should for preference be shorter than the porcelain dental part so that it will not be visible from the outside when the said dental part is applied to the crown or to the artificial tooth.

Figure 3:
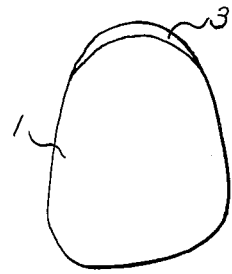
FIGS. 3, 4 and 5 represent, respectively, a front view, side view, and plan-view from above, of the finished crown, to be fitted to the stump of a tooth.
Figure 5:
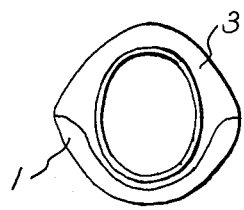
Figure 4:
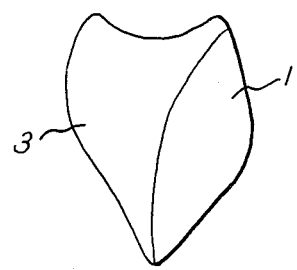

The said dental part 1, produced in the foregoing manner, is fitted to the crown 3 (FIGS. 3, 4 and 5) by the process described above.

I claim:

The method of forming a tooth crown including the steps of fusing a hollowed layer of metal onto the concave inner surface of a hollowed porcelain facing, securing said assembly of facing and metal layer on the stump of a tooth to be crowned, applying modelling material to the assembly and stump and shaping the modelling material against the stump and assembly to the shape of a crown, removing the assembly from the modelled crown, removing the modelled crown from the tooth stump, casting a metal crown of corresponding shape to that of the modelled crown, applying soldering metal to the surface of the metal crown, holding the assembly onto the metal crown in the same position as it was disposed during modelling of the crown, and applying heat to fuse the soldering metal and cause the metal layer of the assembly to be secured onto the metal crown.

References Cited in the file of this patent

UNITED STATES PATENTS

| | | |
|---|---|---|
| 354,833 | Grout | Dec. 21, 1886 |
| 1,423,027 | Rose | July 18, 1922 |
| 2,147,403 | Freedman | Feb. 14, 1939 |
| 2,194,790 | Gluck | Mar. 26, 1940 |